Feb. 20, 1940.　　　　J. W. SLAYTON　　　　2,191,045
SPEED INDICATOR
Filed July 11, 1938　　　　3 Sheets-Sheet 1

John W. Slayton
INVENTOR.
BY C. A. Snow & Co.
ATTORNEYS.

Feb. 20, 1940.  J. W. SLAYTON  2,191,045
SPEED INDICATOR
Filed July 11, 1938  3 Sheets-Sheet 2
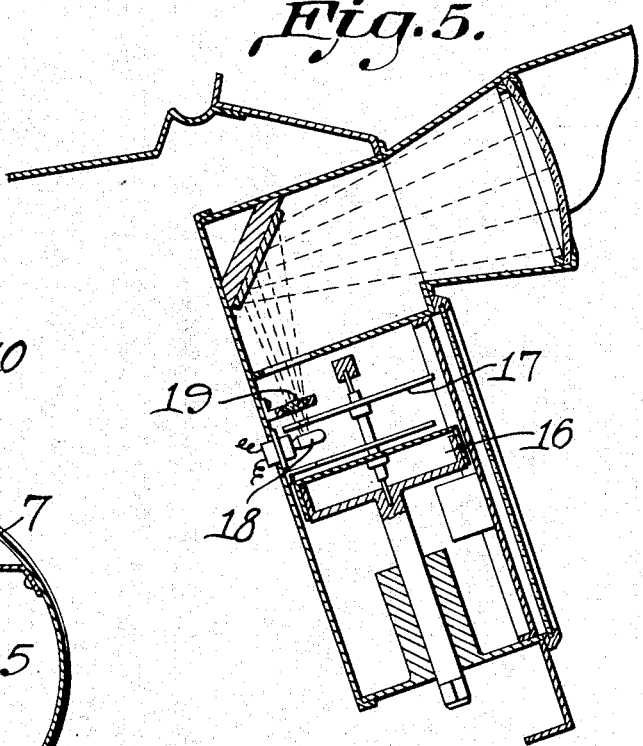
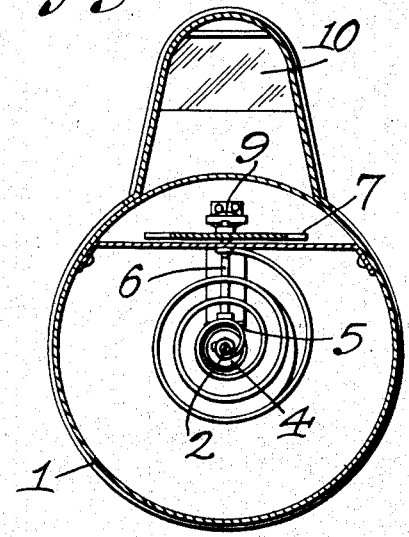
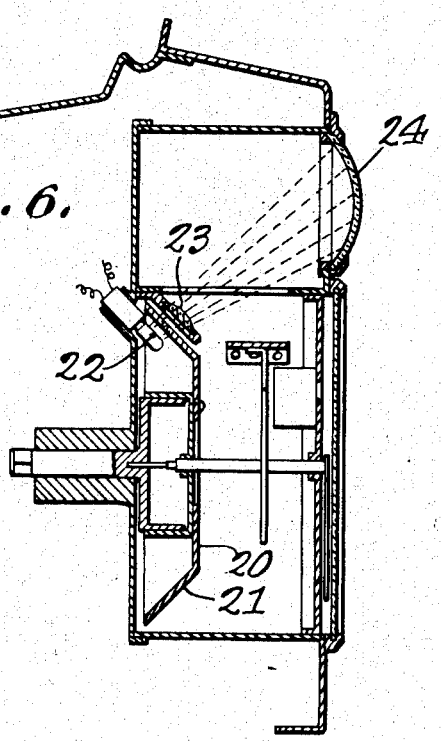
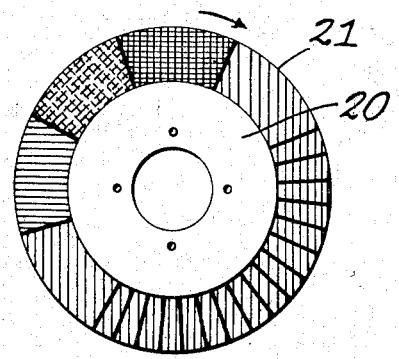
John W. Slayton
INVENTOR.
BY C. Snow Leo.
ATTORNEYS.

Feb. 20, 1940.　　　J. W. SLAYTON　　　2,191,045
SPEED INDICATOR
Filed July 11, 1938　　　3 Sheets-Sheet 3
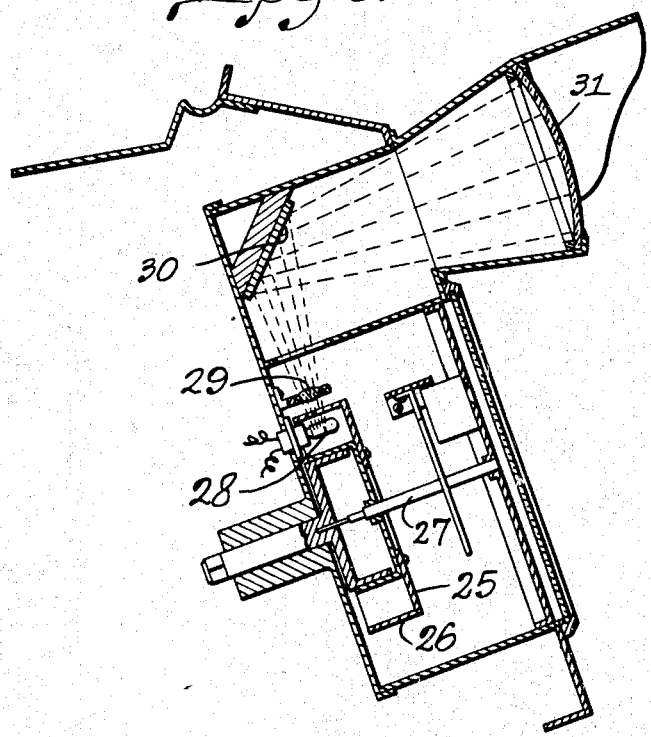
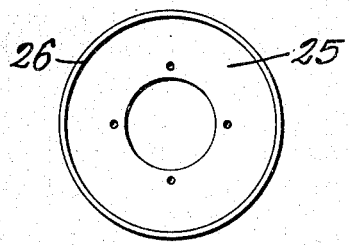
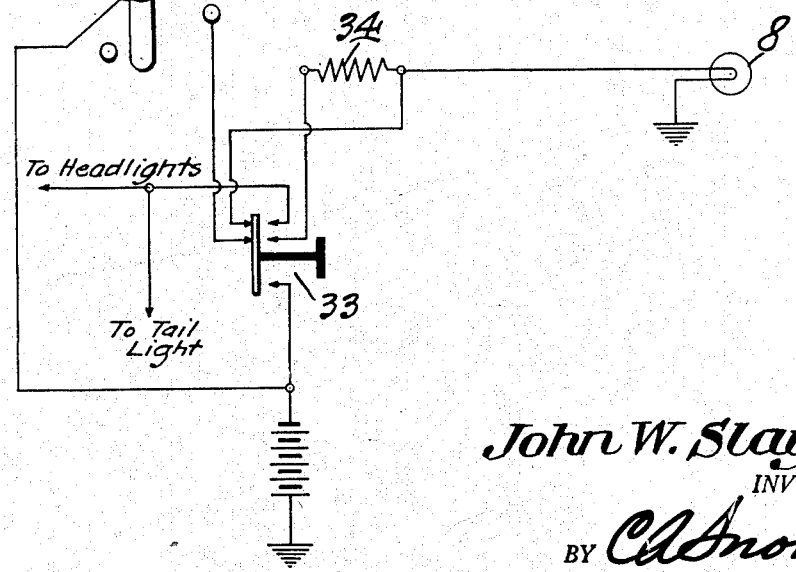
John W. Slayton
INVENTOR.
BY C.A.Snow&Co.
ATTORNEYS.

Patented Feb. 20, 1940

2,191,045

UNITED STATES PATENT OFFICE 2,191,045

SPEED INDICATOR

John W. Slayton, Pittsburgh, Pa.

Application July 11, 1938, Serial No. 218,695

1 Claim. (Cl. 88—24)

This invention relates to a speed indicator designed for use on motor vehicles, one of the objects of the invention being to utilize, in connection with the mechanism of a speedometer, a signal device in the form of a light located in the field of vision of the driver without, however, interfering with his view of the road and which light changes in color as the speed of the vehicle changes from one range of speeds to another so that it is possible for the driver, by observing the color of the light, to determine whether he is driving at an unlawful speed or at different speeds thereunder.

A further object is to provide a device of this character which can be installed readily on the instrument board of the vehicle and which is simple, compact and efficient in operation.

A further object is to so locate the light that the contrasting colors indicating predetermined ranges of speeds can be easily distinguished by the driver without taking his eyes from the road.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings—

Figure 4 is a section on line 4—4, Figure 2.

Figure 5 is a central vertical section through a modified form of indicator.

Figure 6 is a central vertical section through another form of indicator.

Figure 7 is a face view of the modified form of translucent disk forming a part of the structure shown in Figure 6.

Figure 8 is a central vertical section through another modification.

Figure 9 is a face view of the translucent disk used in the structure shown in Figure 8.

Figure 10 is a diagram of the circuit in which the lamp of the indicator can be included.

Figure 1:
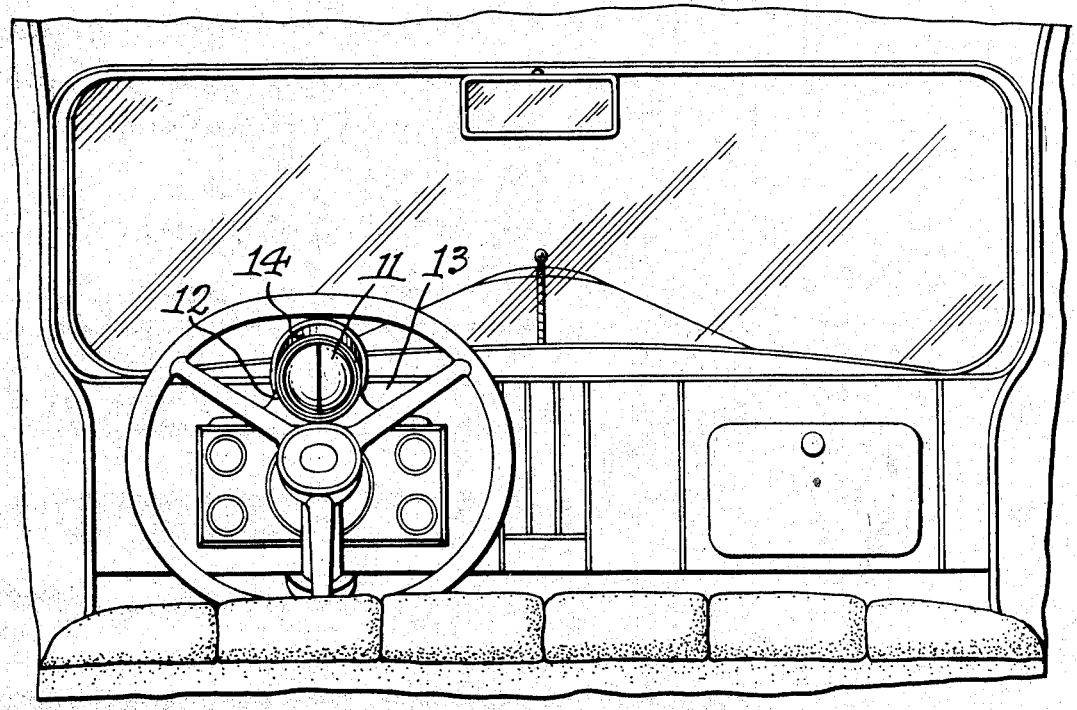
Figure 1 is an elevation of a portion of the interior of a motor vehicle and showing the present improvement mounted on the instrument board.

Referring to the figures by characters of reference 1 designates the housing of a speedometer of the usual or any preferred construction and in the form illustrated the shaft 2 of the hand or pointer 3 of the speedometer is provided with a gear 4 whereby motion is transmitted through a gear 5 to an upwardly extending shaft 6 secured to the center of a disk 7. A portion of this disk extends between a lamp 8 and a lens 9 and above the lens there is located a reflector 10 disposed at such an angle as to deflect the light rays from the lamp and its lens 9 to a frosted lens 11 or the like mounted in a tubular extension 12 projecting from the instrument board 13 in which the casing 1 is mounted. A light shield or hood 14 extends outwardly from and partly around the lens 11 so that the surface of the lens will be shielded from light from without the extension 12.

Disk 7 has a band 15 formed of translucent material or, if desired, the entire disk can be made of this material. The band is divided into segments of different sizes and colors arranged in any desired succession around the disk and each color being adapted to indicate a predetermined range of speed of the vehicle.

When the vehicle is not in motion and the speedometer is at rest, an opaque segment $a$ of the disk will be located between lamp 8 and lens 9 so that no light will be directed against the reflector 10. This segment will remain in position between the lamp and lens during variations of speed until the top speed of a predetermined range is reached, for example, twenty miles per hour at which time the next segment $b$, which can be amber in color, will move into light intercepting position. Consequently as the disk rotates slowly during variations of speed in the second range, this color will remain but as the speed is increased to above this second range, the field of amber color will move away and the signal device will bring the next segment $c$ into intercepting position with the result that a field of blue light will appear on the lens 11 and will follow the amber light thereacross as long as the speeds in the third range are being maintained. Following the appearance of the blue light on the lens and as the speed of the vehicle increases still more, the next segment $d$ of the disk will come into intercepting position and will direct a red light to lens 11. This red light will gradually spread over the lens following the blue and will serve as a warning to the driver that maximum lawful speed has been passed when all portions of lens 11 are red. Further increased speed will be indicated by radial lines e appearing on the red segment d, thereby serving as a warning to the driver that he is travelling at a dangerous speed well in excess of that allowed by law.

It will be noted that the extension 12 and hood 14 are located on the instrument board at a point where they will not obstruct the vision of the driver but nevertheless where the color appearing on the lens 11 will be clearly visible at all times and can be noticed by the driver without moving his eyes from the road.

The structure thus far described is used in connection with a speedometer utilizing a hand or pointer movable on an upwardly inclined dial. If the speedometer is provided with a rotating drum, as shown at 16 in Figure 5 the disk 17 carrying the colored segments, will be connected directly to the drum so as to rotate therewith, the marginal portion of the disk being extended between the lamp 18 and its lens 19. In other respects this structure operates the same as has already been described.

Figure 2:
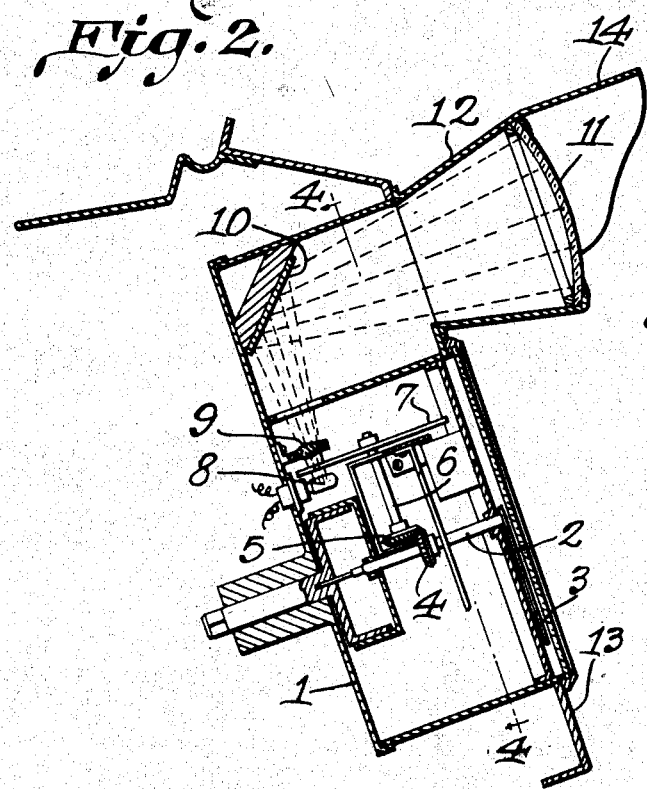
Figure 2 is an enlarged central vertical section through a portion of the instrument board and the indicator thereon.
Figure 3:
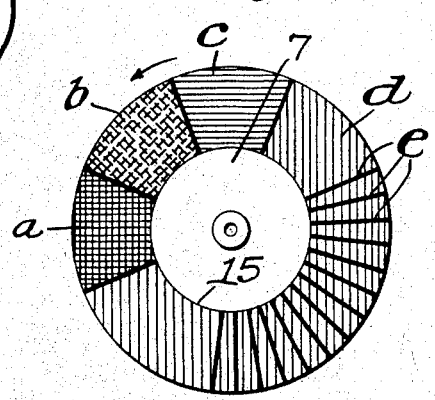
Figure 3 is a face view of the translucent disk forming a part of the mechanism shown in Figure 2.

In Figure 6 the improvements have been shown in slightly modified form. In this structure it is not necessary to use gears 4 and 5 and shaft 6 as illustrated in Figure 2. Instead disk 20 is secured to and rotates with the indicator of the speedometer and has a conical marginal portion or band 21 divided into colored segments as heretofore described and so pitched as to extend between lamp 22 and an inclined lens 23 so that the rays from the lamp will be projected directly to a frosted lens 24 on the instrument board, thus eliminating the use of a tubular extension such as shown at 12 in Figure 2.

A further modification of the apparatus is disclosed in Figure 8 showing a structure combining the features of the apparatus shown in Figures 2 and 6. In other words in this modified form a disk 25 having a cylindrical translucent rim 26 is connected to the shaft 27 of the speedometer and is provided with translucent sections or segments forming the cylindrical band or rim 26 and this band is positioned where it can move between lamp 28 and lens 29 so that the light rays followed by the translucent portions of band 26 will be projected to the reflector 30 and thence to the frosted lens 31. It might be stated that in this modified form of the device it is not necessary to use an indicating hand or index but the speed can be determined solely by the colors of the lights appearing on the lens 31 and, if desired, numerals may be associated with these colored portions. The same feature could also be embodied in the other forms of the device which have been described and shown.

In Figure 10 there has been shown in diagram one way in which the lamp 28 can be connected to the electric system of the vehicle. In this figure the ignition switch has been indicated at 32 and the light switch has been indicated at 33. It will be noted that when the ignition switch is closed the connections to the lamp 8 or the like are completed so that the lamp will be energized.

When switch 33 is shifted for night driving the lamp 8 will remain lighted as will be apparent but as the current is thus compelled to pass through a resistance 34 the lamp 8 will be dimmed.

What is claimed is:

The combination with a speedometer including a rotatable dial, of an indicator for signalling changes from one range of speeds to another range of speeds, said indicator including a translucent lens, a lamp for directing light rays to the lens, a member rotatable with the speedometer dial and synchronized therewith, and translucent sections of different colors carried by the member and designating different speed ranges respectively, said sections being positioned for successive movement into the path of the light rays between the lamp and lens, each section being proportioned to remain in said path during speed variations within the speed range associated with said section, and means carried by said member for intercepting all of the light rays to the lens until the dial of the speedometer displays a speed in excess of a low speed range.

JOHN W. SLAYTON.